(12) United States Patent
Debate et al.

(10) Patent No.: US 9,954,728 B2
(45) Date of Patent: Apr. 24, 2018

(54) MANAGEMENT OF MOBILE DEVICES IN A NETWORK ENVIRONMENT

(71) Applicant: ARXAN TECHNOLOGIES, INC., San Francisco, CA (US)

(72) Inventors: Jeremy Debate, Boston, MA (US); Aaron A. Alexander, Banning, CA (US)

(73) Assignee: ARXAN TECHNOLOGIES, INC., San Francisco, CA (US)

( * ) Notice: Subject to any disclaimer, the term of this patent is extended or adjusted under 35 U.S.C. 154(b) by 244 days.

(21) Appl. No.: 14/682,592

(22) Filed: Apr. 9, 2015

(65) Prior Publication Data

US 2015/0295757 A1 Oct. 15, 2015

Related U.S. Application Data

(60) Provisional application No. 61/978,534, filed on Apr. 11, 2014.

(51) Int. Cl.
*G06F 15/16* (2006.01)
*H04L 12/24* (2006.01)
(Continued)

(52) U.S. Cl.
CPC .... *H04L 41/0803* (2013.01); *G06F 17/30979* (2013.01); *H04L 41/12* (2013.01); *H04W 8/22* (2013.01)

(58) Field of Classification Search
CPC ........... G06F 17/30979; H04L 41/0803; H04L 41/12; H04W 8/22
(Continued)

(56) References Cited

U.S. PATENT DOCUMENTS 5,812,819 A * 9/1998 Rodwin ............ H04L 29/12311
703/23
7,830,826 B2 * 11/2010 Costa-Requena ..... H04L 12/189
370/312

(Continued)

OTHER PUBLICATIONS

Tomiyasu H., et al., "Profile-based Query Routing in a Mobile Social Network", Mobile Data Management, 2006. MDM 2006. 7th International Conference O N Nara, Japan May 10-12, 2006, Piscataway, NJ USA, IEEE, May 10, 2006, (May 10, 2006); 4 pages.

(Continued)

*Primary Examiner* — Moustafa M Meky
*Assistant Examiner* — Thorne E Waugh
(74) *Attorney, Agent, or Firm* — Mannava & Kang, P.C.; Arash Behravesh

(57) ABSTRACT

A network environment can include a proxy management server. The proxy management server can have access to multiple disparately located MDM servers. A mobile device receives configuration information including a network address of the proxy management server. The mobile device stores the network address of the proxy management server. In response to receiving a management notification such as notification that one or more of the multiple MDM servers has management information (e.g., commands, data, etc., to be executed by the mobile device) available for the mobile device, the mobile device utilizes the stored network address to communicate with the proxy management server. The proxy management server checks availability of the management information from multiple disparately located MDM management servers. The proxy management server retrieves the management information from the management servers and forwards it to the mobile device.

7 Claims, 9 Drawing Sheets

(51) Int. Cl.
*G06F 17/30* (2006.01)
*H04W 8/22* (2009.01)

(58) Field of Classification Search
USPC .................................................. 709/203–248
See application file for complete search history.

(56) References Cited

U.S. PATENT DOCUMENTS

| | | | | |
|---|---|---|---|---|
| 7,987,471 | B2* | 7/2011 | Herzog | H04L 67/1095 |
| | | | | 709/202 |
| 8,717,931 | B2* | 5/2014 | Taniuchi | H04L 12/5692 |
| | | | | 370/254 |
| 8,832,228 | B2* | 9/2014 | Luna | G06F 9/5027 |
| | | | | 709/217 |
| 8,893,255 | B1* | 11/2014 | Martini | H04L 63/0884 |
| | | | | 709/238 |
| 8,910,263 | B1* | 12/2014 | Martini | H04L 63/102 |
| | | | | 726/26 |
| 9,282,098 | B1* | 3/2016 | Hitchcock | H04L 63/0884 |
| 9,548,982 | B1* | 1/2017 | Karunakaran | H04L 63/10 |
| 2011/0154135 | A1* | 6/2011 | Tyhurst | G06F 8/61 |
| | | | | 714/57 |
| 2013/0097660 | A1 | 4/2013 | Das et al. | |
| 2015/0278488 | A1* | 10/2015 | Batchu | G06F 21/604 |
| | | | | 726/29 |

OTHER PUBLICATIONS

European Search Report for EP 15 27 5120, dated Sep. 18, 2015, 2 pages.

* cited by examiner

MANAGEMENT OF MOBILE DEVICES IN A NETWORK ENVIRONMENT

RELATED APPLICATIONS

This application is related to and claims the benefit of earlier filed U.S. Provisional Patent Application Ser. No. 61/978,534 entitled "MANAGEMENT OF MOBILE DEVICES IN A NETWORK ENVIRONMENT," filed on Apr. 11, 2014, the entire teachings of which are incorporated herein by this reference.

BACKGROUND

Conventional Mobile Device Management (MDM) software can be used to manage mobile devices in a network. MDM software typically supports services such as over-the-air distribution of applications, data distribution, control of configuration settings for many types of mobile devices, etc. Thus, via MDM software and services, an administrator is able to control operations associated with one or more target mobile devices in a network.

According to certain conventional MDM techniques, a mobile device can be configured to receive communications from a notification service (such as via the Apple Push Notification Service) in response to a respective MDM server providing notification to the notification service that the respective MDM server would like the mobile device to communicate with the MDM server.

As a more specific example, in response to receiving a message from the MDM server to alert a target mobile device, and after verifying the notification message received from the respective MDM server, the notification system "pushes" a corresponding notification to a target mobile device to alert the target mobile device to contact the MDM server. The notification from the notification system indicates to the mobile device that the mobile device is to communicate with the respective MDM server.

During subsequent communications, when communicating with the respective MDM server, the target mobile device can retrieve any number of commands or available sets of data from the MDM server. Each of the commands can cause the target mobile device to perform any suitable function.

BRIEF DESCRIPTION OF DIFFERENT EMBODIMENTS

Conventional ways of implementing MDM (Mobile Device Management) suffer from deficiencies. For example, as discussed above, MDM software executing in a respective mobile device can receive a notification to communicate with a specific MDM server. The mobile device can be configured to store a network address of a respective MDM server that is to be queried by the mobile device for control commands, data, etc. Thus, upon receiving a notification from a "push" notification system, the mobile device communicates with a corresponding MDM server to retrieve available commands. This conventional implementation of MDM is restrictive because the mobile device is able to communicate only with the MDM server as specified by the network address stored in the mobile device to learn of available commands or updates.

Embodiments herein deviate with respect to conventional techniques. For example, one embodiment herein includes a novel way of controlling or updating target mobile devices in a network environment using a proxy MDM server resource. On behalf of a mobile computer device, the proxy MDM server resource is able to communicate with any number of MDM server resources in the network environment. As its name suggests, the MDM proxy server acts as a proxy and conveys messages between the MDM servers and the mobile computer device.

More specifically, in accordance with one embodiment, a network environment can include an MDM proxy resource such as a proxy management server. The proxy management server can have access to multiple disparately located MDM servers. Each MDM server may be controlled and operated by a different organization. To facilitate communications with the proxy management server, during initialization, a mobile device can receive configuration information including a network address of the proxy management server. In one non-limiting example embodiment, the mobile device stores the network address of the proxy management server in an accessible repository such as in local non-volatile memory.

In response to receiving a management notification (such as notification that one or more of multiple MDM servers in the network environment has management information available for the mobile device), the mobile device utilizes the stored network address to communicate with the proxy management server. On behalf of the mobile computer device, the proxy management server checks availability of management information from one or more disparately located MDM management service. As discussed herein, management information available from the one or more MDM servers can include commands, data, etc., for use by the mobile device.

In one embodiment, to check availability of management information such as commands or data, the mobile device sends a management query (i.e., one or more communications) to the proxy management server using the previously stored network address as a destination address for the management query.

The proxy management server (as specified by stored network address) receives the management query from the mobile device. In one embodiment, using map information, the proxy management server identifies a set of one or more multiple management servers assigned to manage the mobile device. On behalf of the mobile device, the proxy management server queries the multiple management servers (assigned to manage the mobile device) for available management information associated with the mobile device. If management information is available, the proxy management server retrieves any management information from the one or more management servers and then forwards the management information retrieved from the management servers to the mobile device.

Accordingly, via the proxy management server, the mobile device can receive management information (e.g., data, commands, communications, etc.) from one or more MDM management servers.

Note that the proxy management server can be configured to store mapping information to perform operations as discussed above. For example, via the mapping information, the proxy management server can identify one or more management servers that are configured to control or provide management information to a respective target mobile device attempting retrieval of management information. For example, the proxy management server can receive a unique identifier value such as a unique network address assigned to the mobile device performing a query for data and/or commands. Via the mapping information and unique identifier value, the proxy management server maps the mobile device to one or more MDM management servers assigned to manage the mobile device.

Assume in this example that, via the mapping information, the one or more MDM management servers assigned to manage the mobile device includes at least a first management server and a second management server. As mentioned, each of the first management server and the second management server can be configured to provide commands and/or data to the proxy management server. The proxy management server retrieves available management information from the first management server and the second management server and forwards the retrieved management information to the target mobile device.

As previously discussed, conventional techniques include directly communicating with only a single MDM management server as opposed to communicating with a proxy management server to retrieve commands and/or data.

In one embodiment, any of the multiple MDM management servers (assigned to control the mobile device) can notify the notification system to alert a particular mobile device that management information is available for the mobile device. In a manner as discussed above, the mobile device can communicate with the proxy management server to initiate retrieval of available management information from the one or more MDM management servers.

As briefly mentioned above, the management information received from the one or more MDM servers can include any suitable type of data to control use of mobile device. In one embodiment, the management information can include data such as configuration information or policy information to control operation of a particular application on the mobile device. The management information itself can specify a particular application on the mobile device to which the management information pertains.

Additionally, the management information also may specify a corresponding command to be executed at the mobile computer device.

In yet further embodiments, the management information may be a command to collect certain type of data that is to be forwarded from the mobile computer device through the proxy management server to a corresponding MDM server.

These and other embodiments are discussed in more detail below.

As mentioned above, note that embodiments herein can include a configuration of one or more computerized devices, workstations, handheld or laptop computers, personal computers, or the like to carry out and/or support any or all of the method operations disclosed herein. In other words, one or more computerized devices or processors in a resource such as a mobile computer device can be programmed and/or configured to operate as explained herein to carry out different embodiments of the invention.

Yet other embodiments herein include software programs to perform the steps and operations as discussed herein. One such embodiment comprises a computer program product including a non-transitory computer-readable storage medium (i.e., any suitable computer readable hardware storage medium, not a carrier wave, to store executable instructions) on which software instructions are encoded for subsequent execution. In one embodiment, the instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium (i.e., any computer readable hardware storage media) such as an optical medium (e.g., CD-ROM), floppy disk, hard disk, memory stick, etc., or other medium such as firmware or microcode in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, one particular example embodiment of the present disclosure is directed to a method and computer program product that includes a computer readable hardware storage medium having instructions stored thereon. For example, in one embodiment, the instructions, when executed by computer processor hardware such as in a mobile computer device, cause the computer processor hardware to: receive configuration information, the configuration information including a network address of a proxy management server; store the network address; and in response to receiving a management notification at the mobile device, utilize the network address to communicate with the proxy management server to check availability of management information from multiple disparately located management servers.

Another embodiment of the present disclosure is directed to a method and computer program product that includes a computer readable hardware storage medium having instructions stored thereon. The instructions, when executed by computer processor hardware such as a proxy management server, cause the computer processor hardware to: receive a management query from a mobile device; identify multiple management servers assigned to manage the mobile device; on behalf of the mobile device, query the multiple management servers for available management information associated with the mobile device; and forward the management information to the mobile device.

The ordering of the steps has been added for clarity sake. These steps can be performed in any suitable order.

Other embodiments of the present disclosure include software programs and/or respective hardware to perform any of the method embodiment steps and operations summarized above and disclosed in detail below.

It is to be understood that each of the multitude of systems, methods, apparatuses, instructions on computer readable storage media, etc., as discussed herein can be embodied strictly as a software program, as a hybrid of software and hardware, or as hardware alone such as within a processor, or within an operating system or a within a software application.

Additionally, although each of the different features, techniques, configurations, etc., herein may be discussed in different places of this disclosure, it is intended that each of the concepts can be executed independently of each other or, where suitable, the concepts can be used in combination with each other. Accordingly, the one or more present inventions as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), and additional points of novelty, the reader is directed to the Detailed Description and Further Summary of Embodiments section and corresponding figures of the present disclosure as further discussed below.

Figure 1:
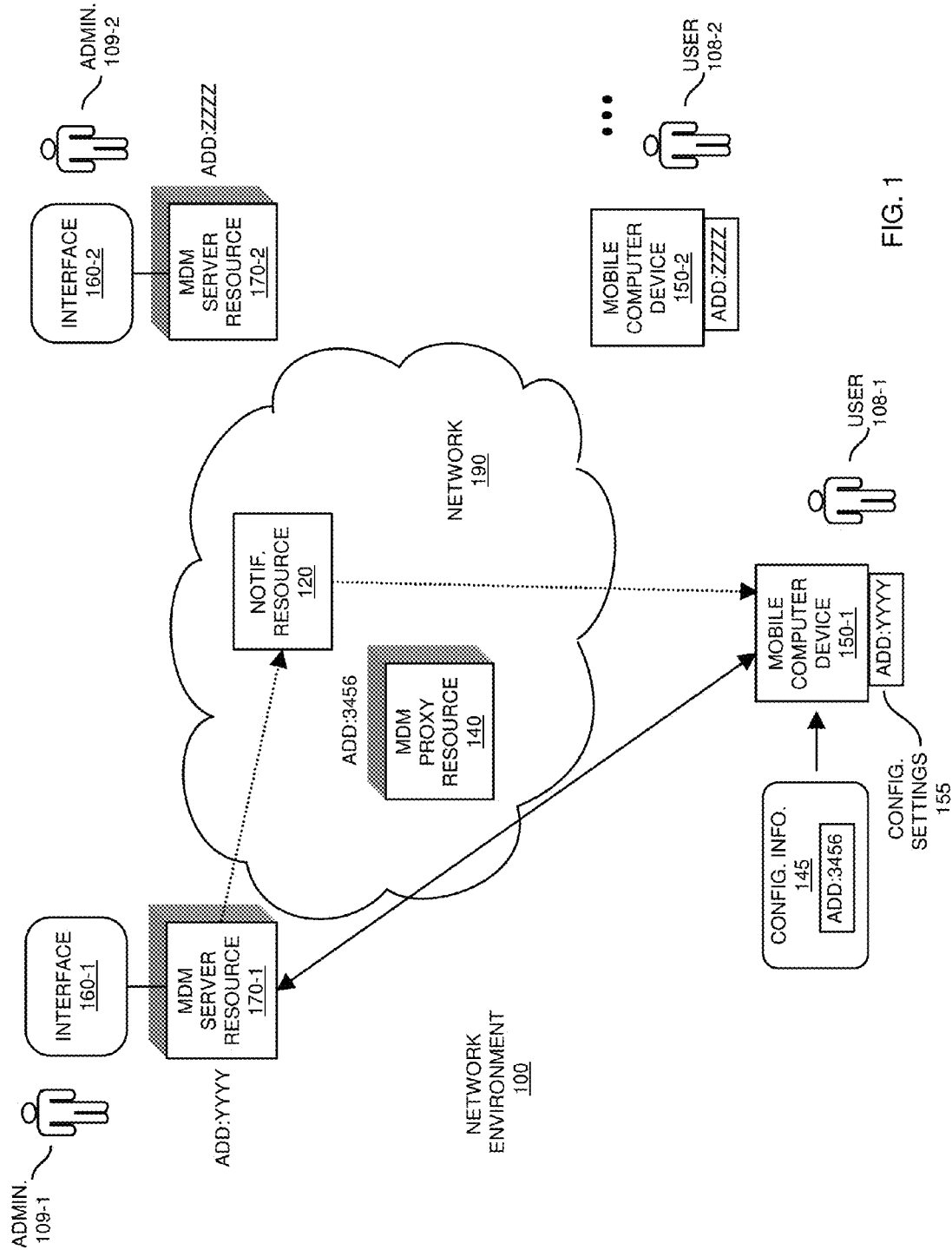
FIG. 1 is an example diagram illustrating a network environment including multiple MDM server resources, an MDM proxy resource, and one or more mobile computer devices according to embodiments herein.

The foregoing and other objects, features, and advantages will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

According to embodiments herein, a network environment can include a proxy management server. The proxy management server can have access to multiple disparately located MDM (Mobile Device Management) servers. In one embodiment, in response to receiving a management notification such as notification that one or more of the multiple MDM servers has management information (e.g., commands, data, etc.) available for the mobile device, the mobile device communicates with the proxy management server. On behalf of the mobile device, the proxy management server checks availability of the management information from multiple disparately located MDM management servers.

Now, more specifically, FIG. 1 is an example diagram illustrating a network environment according to embodiments herein.

As shown, network environment 100 includes one or more users such as user 108-1, user 108-2, and so on. Each of the users in network environment 100 operates a corresponding mobile computer device. For example, user 108-1 operates mobile computer device 150-1; user 108-2 operates mobile computer device 150-2; and so on.

One or more mobile computer devices in network environment 100 may be BYOD-type (Bring Your Own Device) type of devices.

As further shown, the network environment 100 includes one or more MDM server resources to control use of applications on respective mobile computer devices 150. In other words, the one or more MDM server resources such as MDM server resource 170-1, MDM server resource 170-2, etc., manage respective use of mobile computer devices.

For sake of illustration, assume that configuration settings 155 of mobile computer device 150-1 is initially configured to include a network address YYYY assigned to MDM server resource 170-1. Administrator 109-1 provides input through interface 160-1 to make management information (such as data, commands, control information, configuration information, policies, etc.) available to the mobile computer device 150-1 through MDM server resource 170-1. Interface 160-1 controlled by administrator 109-1 can include any of one or more resources such as a display screen, graphical user interface, computer hardware, MDM software, etc.

To notify mobile computer device 150-1 (and user 108-1) that management information is available from MDM server resource 170-1, the MDM server resource 170-1 or administrator 109-1 communicates with notification resource 120. The communications from the MDM server resource 170-1 to the notification resource 120 can include transmission of an appropriate certificate associated with the mobile computer device 150-1. By way of non-limiting example, the notification resource 120 can be an APNS (Apple Push Notification Server) resource or other suitable functioning resource that provides notification to mobile computer devices in network environment 100.

Based on received communications such as a certificate associated with mobile computer device 150-1, the notification resource 120 transmits a communication to mobile computer device 150-1. The communication transmitted to mobile computer device 150-1 provides notification to MDM software in the mobile computer device 150-1 to contact the MDM server resource 170-1. In accordance with configuration settings 155 (such as a network address YYYY of a target MDM server resource with which the mobile computer device 150-1 is associated), the mobile computer device 150-1 communicates with the MDM server resource 170-1 to retrieve any available management information as prompted by the notification.

As previously discussed, conventional control of a respective mobile computer device using a single MDM server resource such as MDM server resource 170-1 to retrieve control information can be restrictive. For example, there may be instances in which it is desirable for multiple MDM resources (and corresponding administrators) to collectively control each of one or more of the mobile computer devices in network environment 100.

To accommodate such an instance, in contrast to conventional techniques, embodiments herein include MDM proxy resource 140. As its name suggests, the MDM proxy resource 140 provides a corresponding mobile computer device access to available management information from one or more MDM resources.

As previously discussed, the mobile computer device 150-1 can be configured with a corresponding target network address (i.e., address YYYY) of the MDM server resource 170-1. In certain instances, note that the mobile computer device 150-1 may not be configured with a network address at all if it was not pre-configured to communicate with an MDM server such as MDM server resource 170-1.

Embodiments herein can include forwarding corresponding configuration information 145 to the mobile computer device to initialize or modify current configuration settings 155 such that mobile computer device 150-1 communicates with MDM proxy resource 140 to retrieve data and/or commands from respective server resources 170. To achieve this end, the mobile computer device 150-1 can receive the configuration information 145 from any suitable resource.

In one example embodiment the mobile computer device 150-1 receives the configuration information 145 in a corresponding communication such as an email message received by the mobile computer device 150-1. The mobile computer device 150-1 can be configured to utilize the network address 3456 (such as a URL or Uniform Resource Locator) in the configuration information 145 to initialize or overwrite current configuration settings 155 associated with mobile computer device 150-1.

As shown, the address 3456 in configuration information 145 represents a network address of the MDM proxy resource 140. Thus, mobile computer device 150-1 includes a pointer to MDM proxy resource 140 instead of MDM server respective 170-1. As a consequence of updating configuration settings 155 associated with mobile computer device 150-1, when prompted via a communication from notification resource 120, the mobile computer device 150-1 communicates with MDM proxy resource 140 to receive management information as opposed to communicating directly with MDM server resource 170-1 upon notification from notification resource 120 that data and/or commands are available.

Accordingly, embodiments herein include, at a mobile computer device: receiving configuration information 145 (the configuration information 145 can include a network address 3456 of MDM proxy resource 140); storing the network address 3456 such that the network address 3456 is accessible to the mobile computer device 150-1; and in response to receiving a management notification at the mobile computer device 150-1 from notification resource 120, utilizing the network address 3456 to communicate with the MDM proxy resource 140 and check availability of management information from multiple disparately located management servers (such as MDM server resource 170-1, MDM server resource 170-2, etc.). Additional details of communicating through MDM proxy resource 140 to retrieve data and/or commands are more particularly shown in the following figures.

Note that embodiments herein may be useful in any environment such as organizations employing distribution and management of mobile computer devices. For example, MDM proxy resource 140 enables one or more administrators such as administrator 109-1, administrator 109-2, etc., from same or different organizations, to manage use of one or more target computer devices 150.

In one non-limiting example embodiment, in furtherance of configuring the mobile computer device 150-1 to communicate with MDM proxy resource 140, the mobile computer device 150-1 can be configured to communicate with a resource such as an Apple™ portal of a respective server that produces a certificate for the mobile computer device 150-1. The mobile computer device 150-1 forwards or makes the certificate available to managing servers such as MDM server resource 170-1 and MDM server resource 170-2.

When a respective MDM server resource has management information such as data and/or commands for the mobile computer device 150-1, a respective server resource forwards the certificate to notification resource 120. Upon receipt of the certificate, notification resource 120, in turn, notifies mobile computer device 150-1 to communicate with MDM proxy resource 140 to retrieve the available management information. On behalf of the mobile computer device 150-1, the MDM proxy resource 140 can be configured to check availability of management information from multiple server resources such as MDM server resources 170-1 and 170-2. As is more particularly shown and discussed in the following figures, the MDM proxy resource 140 forwards the management information available from the one or more MDM server resources 170 to mobile computer device 150-1.

Figure 2:
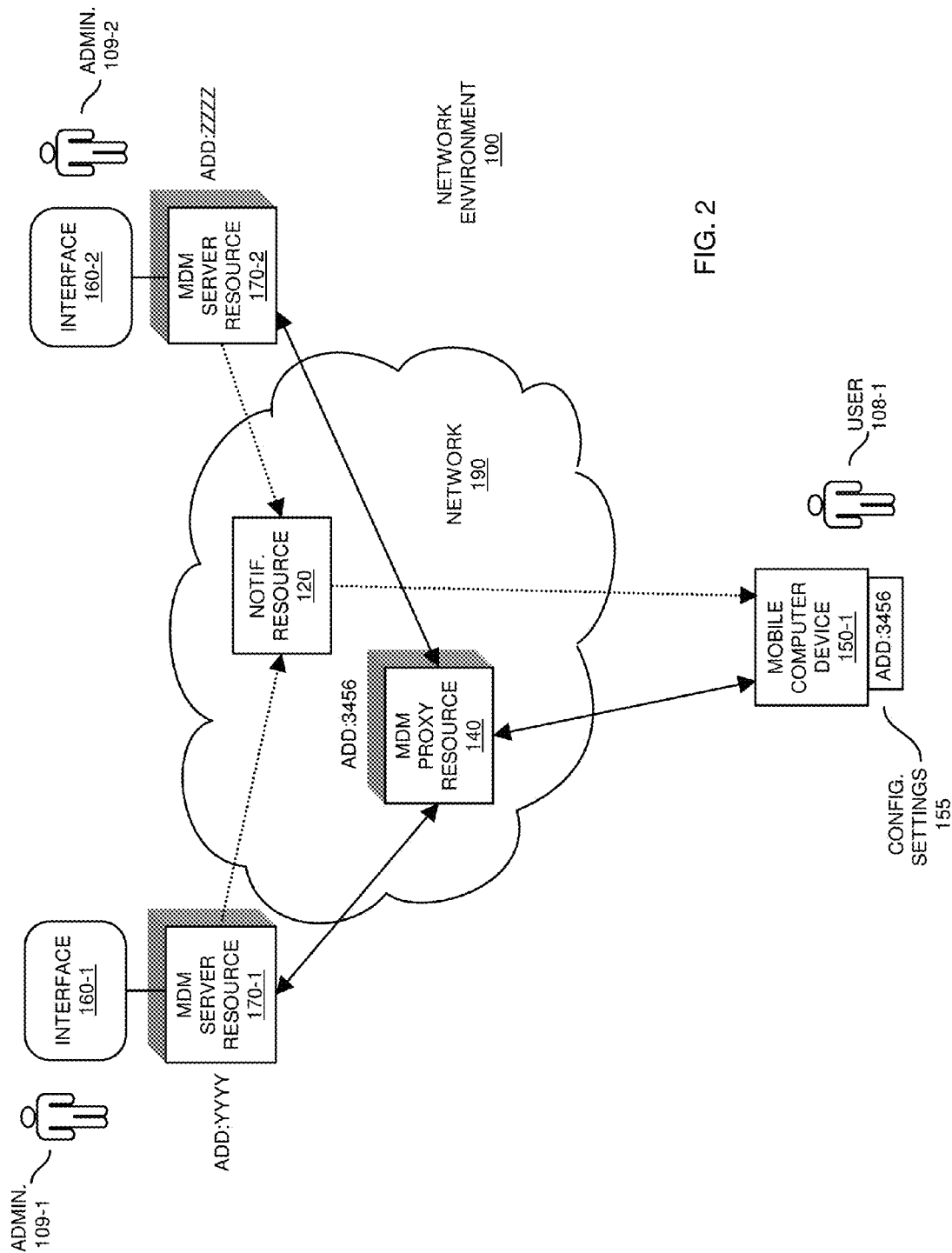
FIG. 2 is an example diagram illustrating association of a mobile computer device to a corresponding MDM proxy resource via use of configuration settings according to embodiments herein.

FIG. 2 is an example diagram illustrating configuration of a mobile computer device according to embodiments herein. As shown, the configuration settings 155 of mobile computer device 150-1 have been modified to include the network address 3456 assigned to MDM proxy resource 140. As previously discussed, the configuration settings 155 can represent a network address of a corresponding resource to be queried upon receiving notification from notification resource 120 that management information is available to the mobile computer device 150-1.

Note that in a similar manner as discussed, each of the mobile computer devices residing in network environment 100 can be configured with an appropriate address of a proxy resource providing access to one or more MDM server resources that supply management information to the corresponding mobile computer device. Thus, a proxy management server can be configured to facilitate distribution of management information to multiple mobile computer devices in network environment 100.

As generally shown in FIG. 2 and as previously discussed above, in response to receiving notification from notification resource 120, mobile computer device 150-1 communicates with MDM proxy resource 140 to retrieve management information from MDM server resource 170-1 and/or MDM server resource 170-2.

Figure 3:
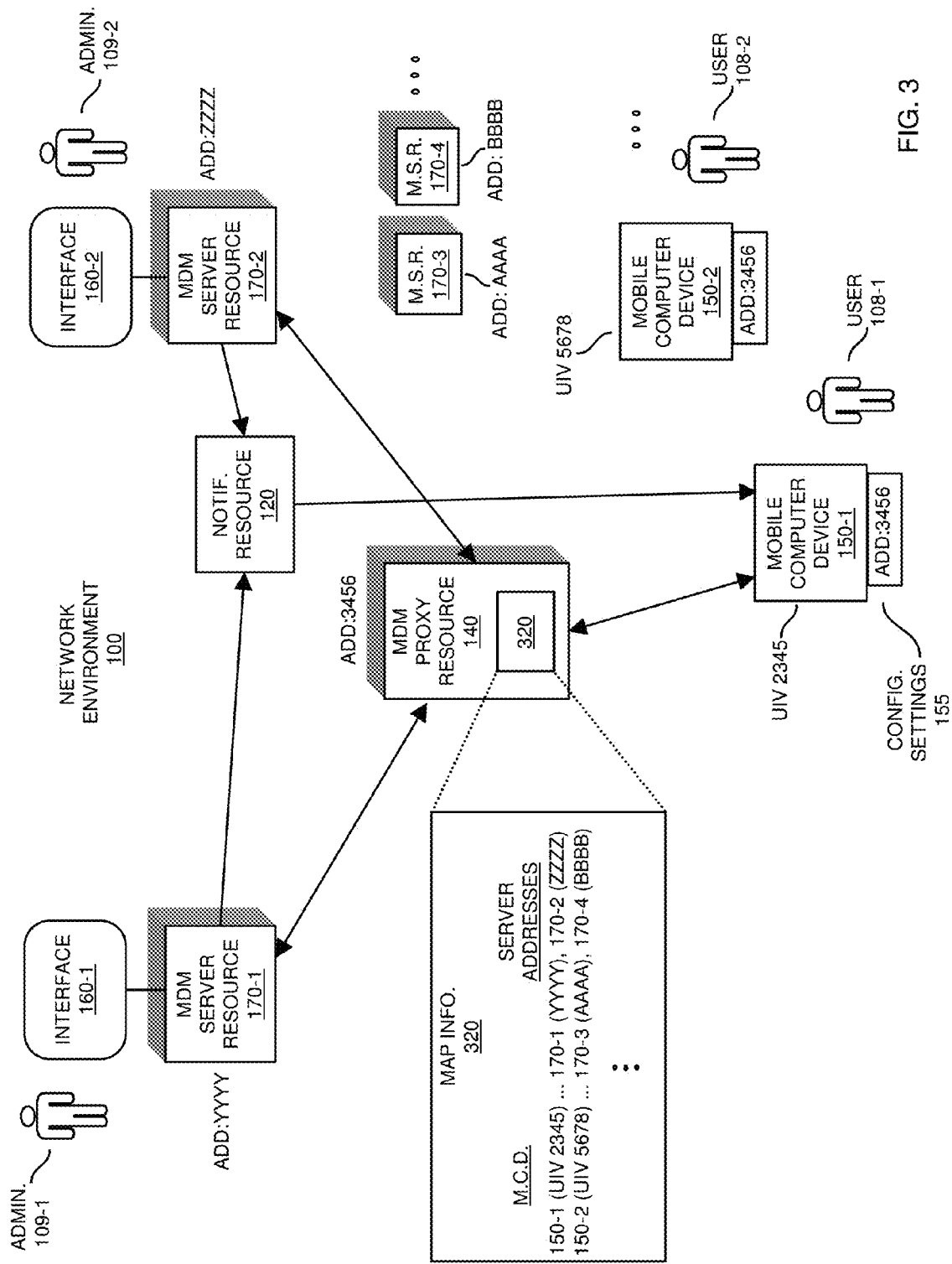
FIG. 3 is an example diagram illustrating use of map information to keep track of one or more MDM server resources associated with each corresponding mobile computer device according to embodiments herein.

FIG. 3 is an example diagram illustrating use of map information to keep track of one or more MDM server resources associated with each corresponding mobile computer device according to embodiments herein.

As shown in this example embodiment, MDM proxy resource 140 has access to map information 320. In one non-limiting example embodiment, MDM proxy resource 140 generates and/or manages map information 320, although any suitable resource can be configured to produce map information 320.

As its name suggests, the map information 220 provides a mapping between a corresponding mobile computer device in network environment 100 and one or more MDM server resources present in network environment 100 that control operations of the corresponding mobile computer device.

In this example embodiment, the first entry of map information 320 indicates that: i) mobile computer device 150-1 (assigned a unique identifier value 2345) is managed by MDM server resource 170-1 (assigned a network address of YYYY); ii) mobile computer device 150-1 is also managed by MDM server resource 170-2 (assigned a network address of ZZZZ).

The second entry of map information 320 indicates that: i) mobile computer device 150-2 (assigned a unique identifier value 5678) is managed by MDM server resource 170-3 (assigned a network address of AAAA); ii) mobile computer device 150-2 is also managed by MDM server resource 170-4 (assigned a network address of BBBB); and so on.

As will be discussed later in this specification, when communicating with the MDM proxy resource 140 to check for available management information, the mobile computer device 150-1 provides corresponding identity information such as unique identifier value 2345 to the MDM proxy resource 140. Accordingly, the MDM proxy resource 140 is apprised of which of multiple mobile computer devices in network environment perform a respective inquiry.

Note that the unique identifier value 2345 can be any suitable information. For example, the unique identifier value 2345 may represent a corresponding network address assigned to the mobile computer device 150-1.

In one embodiment, the mobile computer devices and respective MDM proxy resources communicate with each other in accordance with a client/server protocol. Network environment 100 can be configured to facilitate conveyance of respective communications (e.g., wireless communications, wired communications, etc.) from the mobile computer device 150-1 to MDM proxy resource 140 via a protocol such as Hypertext transfer protocol or HTTP. However, note that any suitable protocol can be used to support communications between respective mobile computer devices and corresponding proxy resources.

When communicating with the MDM proxy resource 140, the mobile computer device 150-1 can be configured to generate a communication including a source address and a destination address. The source address in the communication represents the network address assigned to the mobile computer device 150-1. The destination address in the communication represents the network address of the MDM proxy resource 140 which the communications transmitted. The network environment 100 forwards the communication using the destination address. The source address of the communication provides notification to MDM proxy resource 140 of the identity of the mobile computer device 150-1.

As mentioned above, the MDM proxy resource 140 can be configured to communicate with each of MDM server resource 170-1 and MDM server resource 170-2 to forward corresponding management information to mobile computer device 150-1.

Figure 4:
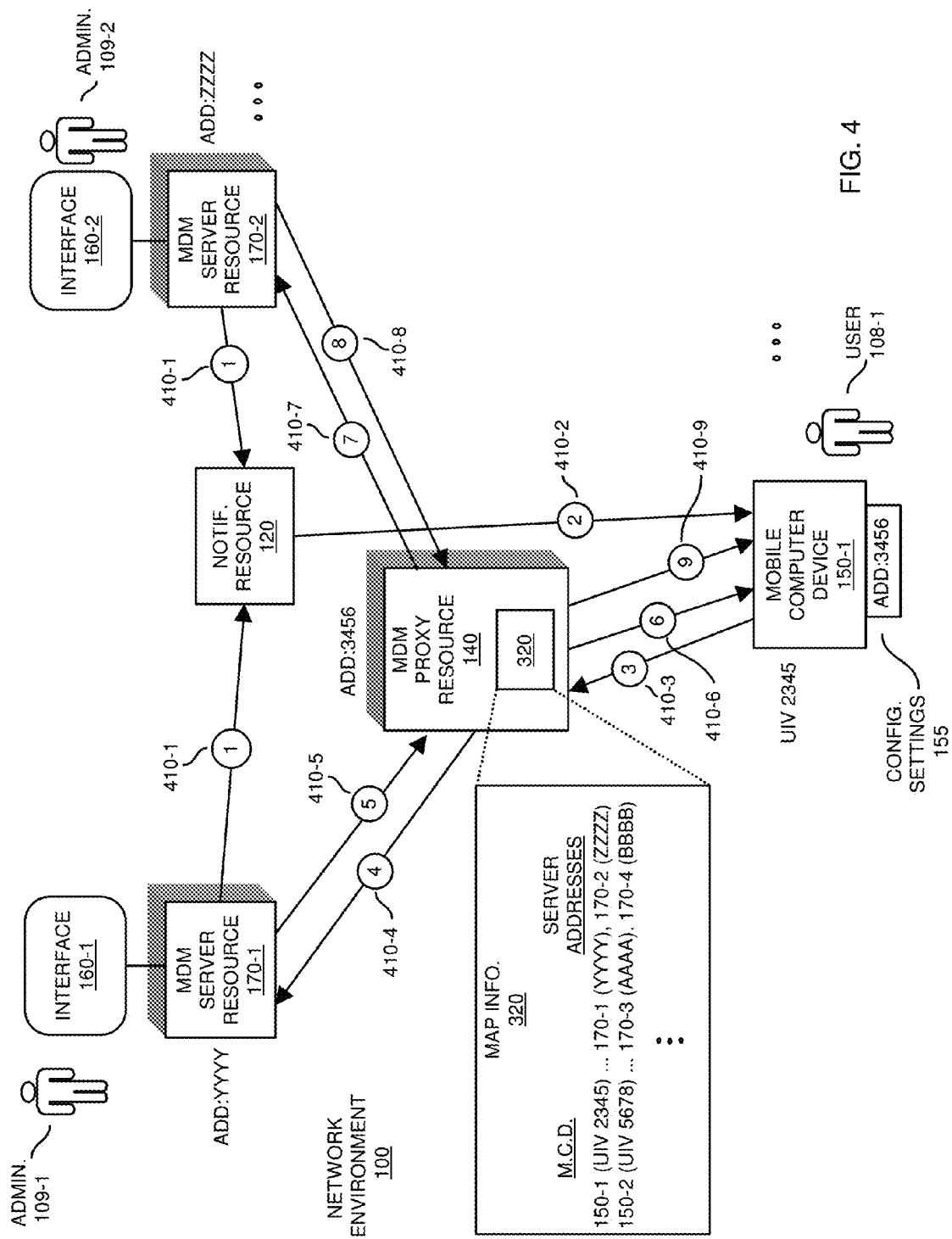
FIG. 4 is an example diagram illustrating a flow of communications facilitating conveyance of management information through an MDM proxy resource to a corresponding mobile computer device according to embodiments herein.

FIG. 4 is a more specific example diagram illustrating a flow of communications facilitating conveyance of management information through an MDM proxy resource to a corresponding mobile computer device according to embodiments herein. Note that arrows associated with corresponding communications 410 generally illustrate the direction of corresponding communications. However, note that communications 410 can occur in both directions where applicable.

Subsequent to updating or initiating configuration settings 155 associated with mobile computer device 150-1 to point to the MDM proxy resource 140, multiple administrators such as administrator 109-1 and administrator 109-2 produce management information for retrieval by a corresponding mobile computer device.

In this example embodiment, via communications 410-1, any of administrators 109 (or MDM server resources 170) are able to notify notification resource 120 that corresponding management information is available for retrieval from a respective MDM server resource.

For example, if MDM server resource 170-1 has management information for a corresponding mobile computer device, communications 410-1 (from MDM server 170-1 to notification resource 120) inform notification resource 120 to alert mobile computer device 150-1 that management information is available. In a similar manner, if MDM server resource 170-2 has corresponding available management information for a corresponding mobile computer device, communications 410-1 (from MDM server 170-2 to notification resource 120) inform the notification resource 120 to alert mobile computer device 150-1 that management information is available.

Thus, multiple resources are able to communicate with notification resource 120 to indicate when mobile computer device 150-1 is to be alerted to communicate with MDM proxy resource 140.

Assume further in this example that notification resource 120 receives notification from either or both of MDM server resource 170-1 and MDM server resource 170-2 to alert mobile computer device 150-1 of available management information. As previously discussed, the mobile computer device 150-1 can be configured to provide a same certificate to both MDM server resource 170-1 and MDM server resource 170-2. By way of non-limiting example, each of the MDM server resources 170-1 and 170-2 can use the received certificate to inform notification resource 120 to alert mobile computer device 150-1.

Because mobile computer device 150-1 retrieves available management information through MDM proxy resource 140, there is not necessarily a need for the mobile computer device 150-1 to know which of the MDM server resources 170 generated the alert.

In response to receiving an alert notification from one or both of MDM server resources 170-1 and MDM server resource 170-2, the notification resource 120 initiates communications 410-2 to notify (via a management notification) mobile computer device 150-1 of the alert. Note again that the notification received by mobile computer device 150-1 from notification resource 120 may not include information indicating which of the multiple MDM server resources 170-1 and 170-2 have corresponding management information available for retrieval.

In one embodiment, receipt of the management notification (such as communications 410-2) from notification resource 120 indicates to mobile computer device 150-1 that management information is available from at least one of the multiple disparately located management servers. If the mobile computer device 150-1 is currently in a sleep mode when it receives the notification from notification resource 120, the notification received from the notification resource 120 can cause the mobile computer device 150-1 to wake up.

As previously discussed, the available management information from one or more MDM server resources 170 can specify control operations to be applied to the mobile device. For example, the management information can be a command indicating to perform a function such as a complete or partial device wipe (e.g., delete data, uninstall one or more applications, etc.); the management information can be a command indicating to change a passcode associated with the mobile computer device; the management information can be a command to retrieve data from the mobile computer device; and so on.

Thus, in one non-limiting example embodiment, the mobile computer device 150-1 can be configured to receive the management notification from a push notification server (such as from notification resource 120), which is disparately located with respect to the MDM management servers 170. As previously discussed, the push notification server (such as notification resource 120) provides the management notification to the mobile computer device 150-1 in response to the alert from the one or more MDM server resources that management information is available.

In response to receiving the management notification from notification resource 120 that management information is available from one or more of the MDM server resources 170, via communications 410-3, the mobile computer device 150-1 generates a management query to MDM proxy resource 140. The mobile computer device 150-1 generates the management query to retrieve any available management information pertaining to mobile computer device 150-1.

Subsequent to receiving the management query from mobile computer device 150-1, the MDM proxy resource 140 checks availability of management information from one or more MDM server resources 170 assigned to manage mobile computer device 150-1.

In this example embodiment, assume that the management query as generated by mobile computer device 150-1 includes a corresponding unique identifier value 2345. The unique identifier value 2345 indicates to MDM proxy resource 140 that mobile computer device 150-1 generated the management query.

The MDM proxy resource 140 uses the corresponding unique identifier value 2345 to identify corresponding MDM server resources that have been assigned to manage mobile computer device 150-1. For example, in one embodiment, the MDM proxy resource maps the unique identifier value 2345 to the first entry in map information 320. Via the first entry in map information 320, the MDM proxy resource 140 identifies that MDM server resource 170-1 and MDM server resource 170-2 have been assigned to manage mobile computer device 150-1. In accordance with map information 320, on behalf of the mobile computer device 150-1, the MDM proxy resource 140 checks with both MDM server resource 170-1 and MDM server resource 170-2 to determine availability of management information for mobile computer device 150-1.

More specifically, via communications 410-4, MDM proxy resource 140 communicates a management query to MDM server resource 170-1 to determine if MDM server resource 170-1 has any available management information for mobile computer device 150-1. Assuming that management information is available from MDM server resource 170-1, via communications 410-5, the MDM server resource 170-1 forwards corresponding management information (such as one or more commands, sets of data, etc.) to MDM proxy resource 140.

Via further communications 410-6, the MDM proxy resource 140 forwards management information retrieved from MDM server resource 170-1 to mobile computer device 150-1.

Accordingly, through MDM proxy resource 140, mobile computer device 150-1 is able to receive management information from MDM server resource 170-1 as provided by administrator 109-1.

After completion of forwarding management information from MDM server resource 170-1 to mobile computer device 150-1, via communications 410-7, MDM proxy resource 140 communicates a management query to MDM server resource 170-2 to determine if MDM server resource 170-2 has any available management information (such as one or more commands, sets of data, etc.) for mobile computer device 150-1. Assuming that management information is available from MDM server resource 170-2, via communications 410-8, the MDM server resource 170-2 forwards corresponding management information to MDM proxy resource 140.

Via further communications 410-7, the MDM proxy resource 140 forwards management information retrieved from MDM server resource 170-2 to mobile computer device 150-1.

Accordingly, through MDM proxy resource 140, mobile computer device 150-1 is able to receive management information from MDM server resource 170-2 as provided by administrator 109-2.

Figure 5:
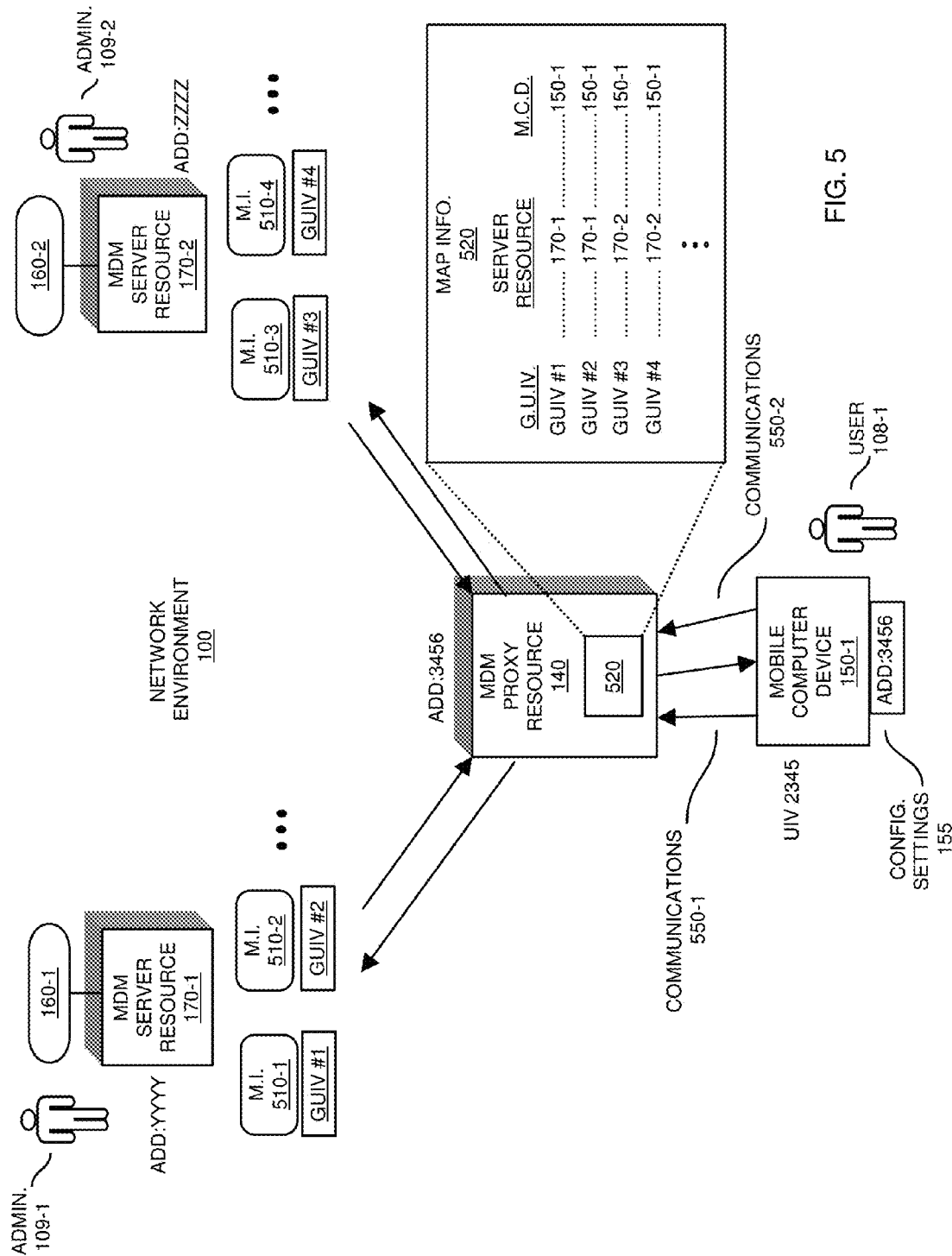
FIG. 5 is an example diagram illustrating use of globally unique identifier values to manage communications between a mobile computer device and one or more MDM resources through a proxy management server according to embodiments herein.

FIG. 5 is an example diagram illustrating use of globally unique identifier values to perform multiplexing and forwarding of messages according to embodiments herein.

In one embodiment, each of the MDM server resources 170 generates and associates a corresponding globally unique identifier value to respective management information such as a command or set of data to be forwarded to the mobile computer device 150-1.

For example, the MDM server resource 170-1 can be configured to: generate first management information 510-1 for mobile computer device 150-1; generate second management information 510-2 for mobile computer device 150-1; and so on.

By way of a non-limiting example, the MDM server resource 170-1 (or other suitable resource) assigns a first globally unique identifier value GUIV #1 to the first management information 510-1; the MDM server resource 170-2 assigns a second globally unique identifier value GUIV #2 to the second management information 510-2; and so on. The MDM server resource 170-1 utilizes the globally unique identifier values to keep track of the different commands.

In a similar manner, the MDM server resource 170-2 can be configured to: generate third management information 510-3 for mobile computer device 150-1; generate fourth management information 510-4 for mobile computer device 150-1; and so on.

By way of a non-limiting example, the MDM server resource 170-2 assigns a third globally unique identifier value GUIV #3 to the third management information 510-3; the MDM server resource 170-2 assigns a fourth globally unique identifier value GUIV #4 to the fourth management information 510-4; and so on. The MDM server resource 170-2 utilizes the globally unique identifier values to keep track of the different management information.

In a manner as previously discussed, the MDM proxy resource 140 MDM server resource retrieves and forwards corresponding management information such as management information 510-1, management information 510-2, management information 510-3, management information 510-4, etc., to mobile computer device 150-1.

In one embodiment, when forwarding corresponding management information to mobile computer device 150-1, the MDM proxy resource 140 also forwards a corresponding globally unique identifier value associated with each set of management information to the mobile computer device 150-1. Accordingly, the mobile computer device 150-1 is able to identify an appropriate globally unique identifier value associated with corresponding received management information.

As shown, upon retrieving and forwarding management information available from MDM server resources to mobile computer device 150-1, the MDM proxy resource 140 can be configured to keep track of the different globally unique identifier values associated with the forwarded management information such that the globally unique identifier value can be used as a way to identify which MDM server resource or mobile computer device a message pertains.

In one embodiment, the MDM proxy resource 140 is configured to store status information indicating that the first globally unique identifier value GUIV #1 and the second globally unique identifier value GUIV #2 are associated with respective management information 510-1 and 510-2 retrieved and forwarded from MDM server resource 170-1 to mobile computer device 150-1.

In a similar manner, when retrieving and forwarding management information 510-3 and 510-4, the MDM proxy resource 140 can be configured to store status information indicating that the third globally unique identifier value GUIV #3 and the fourth globally unique identifier value GUIV #4 are associated with respective management information 510-3 and 510-4 retrieved and forwarded from MDM server resource 170-2 to mobile computer device 150-1.

In a similar manner that the MDM server resources 170 tag corresponding management information with GUIVs forwarded to the mobile computer device 150-1, in a reverse direction, the mobile computer device 150-1 can be configured to tag communications to the MDM proxy resource 140 with an appropriate globally unique identifier value to which the corresponding communications pertain.

The MDM proxy resource 140 can be configured to use the globally unique identifier value associated with each communication to determine to which of the MDM server resources to forward communications from the mobile computer device 150-1 to the appropriate MDM server resource.

For example, first communications 550-1 generated by and received from the mobile computer device 150-1 can include the first globally unique identifier value GUIV #1 to indicate that such communications 550-1 are associated with the first management information 510-1 generated by the MDM server resource 170-1. By way of non-limiting example, the first management information 510-1 can be an inventory command to retrieve and forward a certain type of data from the mobile computer device 150-1 to the MDM server resource 170-1. In such an instance, in response to receiving and executing the first management information 510-1 (inventory command), the mobile computer device 150-1 collects and forwards appropriate data as specified by the inventory command as first communications 550-1 to the MDM proxy resource 140. Because the first communications 550-1 is a response to received management information 510-1, the mobile computer device 150-1 tags the first communications 550-1 with the first globally unique identifier value GUIV #1 and forwards the first communications 550-1 to the MDM proxy resource 140.

The MDM proxy resource 140 receives the first communications 550-1 and, since the first communications 550-1 include the first globally unique identifier value GUIV #1 which maps to MDM server resource 170-1 as indicated by map information 520, forwards the first communications 550-1 to MDM server resource 170-1. Thus, the globally unique identifier value can be used as a tag to forward messages to an appropriate resource in network environment 100.

The MDM server resource 170-1 utilizes the corresponding first globally unique identifier value GUIV #1 to determine that the first communications 550-1 pertain to a command from server resource 170-1.

In this non-limiting example embodiment, second communications 550-2 as generated by and received from the mobile computer device 150-1 can include the third globally unique identifier value GUIV #3 to indicate that such communications are associated with the third management information 510-3 generated by the MDM server resource 170-2.

By further way of non-limiting example, the third management information 510-3 can be an inventory command to retrieve and forward a certain type of data from the mobile computer device 150-1 to the MDM server resource 170-2. In such an instance, in response to receiving the third management information 510-3 (inventory command), the mobile computer device 150-1 collects and forwards the data as specified by the inventory command as second communications 550-2 to the MDM proxy resource 140. In one embodiment, the mobile computer device 150-1 tags the second communications 550-2 with the third globally unique identifier value GUIV #3 and forwards the second communications 550-to to the MDM proxy resource 140.

The MDM proxy resource 140 receives the second communications 550-2 and, since the second communications 550-2 include the third globally unique identifier value GUIV #3 which maps to MDM server resource 170-2, forwards the second communications 550-2 to MDM server resource 170-2. The MDM server resource 170-2 utilizes the corresponding third globally unique identifier value GUIV #3 to determine that the second communications 550-2 pertain to the third management information 510-3.

In this way, the globally unique identifier values can facilitate communications between the mobile computer device 150-1 and corresponding MDM server resources through the MDM proxy resource 140. That is, in response to receiving and detecting that a first communication 550-1 from the mobile computer device 150-1 is tagged with (or includes) the first unique identifier value GUIV #1, the MDM proxy resource 140 forwards the first communications 550-1 to the MDM server resource 170-1.

In response to receiving and detecting that second communications 550-to from the mobile computer device 150-1 is tagged with (or includes) the third unique identifier value GUIV #3, the MDM proxy resource 140 forwards the second communications 550-2 to the MDM server resource 170-2. Accordingly, the globally unique identifier values can be used by the MDM proxy resource 140 to identify which of multiple server resources communications are to be transmitted.

In certain instances, the MDM proxy resource 140 can be configured to generate management information for mobile computer device 150-1. In a similar manner as discussed above, the MDM proxy resource can be configured to notify mobile computer device 150-1 (such as through notification resource 120) that management information is available for retrieval. Also, in a similar manner as discussed above, the MDM proxy resource 140 can be configured to generate a corresponding globally unique identifier value for corresponding generated management information. For example, in one non-limiting example embodiment, the MDM proxy resource 140 tags the generated management information with the globally unique identifier value. In a reverse direction, when communicating with the MDM proxy resource 140, the mobile computer device 150-1 uses the globally unique identifier value generated by the MDM proxy resource 140 to indicate to which management information the communications pertain.

As previously discussed, the MDM proxy resource 140 conveys the management information available from MDM server resource 170-1 to mobile computer device 150-1. In response to receiving a message from the MDM server resource 170-1 indicating completion of conveying one or more management communications from the MDM server resource 170-1 through MDM proxy resource 140 to mobile computer device 150-1, the MDM proxy resource 140 initiates communications with the second management server to check for availability of management information. Assuming that management information is available from MDM server resource 170-2, as previously discussed, the MDM proxy resource 140 retrieves management information from the MDM server resource 170-2 and forwards the retrieved management information to the mobile computer device 150-1. In response to detecting completion of conveying management information from the MDM server resource 170-2 through MDM proxy resource 140 to mobile computer device 150-1, the MDM proxy resource 140 transmits a status message to the mobile computer device 150-1 indicating that there is no additional management information available from the management servers for retrieval by the mobile computer device 150-1. Thus, the mobile computer device 150-1 can be notified by MDM proxy resource 140 that all available management information has been forwarded from respective MDM server resources through MDM proxy resource 140 to mobile computer device 150-1.

In accordance with a yet further example embodiment, when communicating with the MDM server resource 170-1, the MDM proxy resource 140 may be alerted by the MDM server resource 170-1 via a respective message that no management information for the mobile computer device 150-1 is currently available from the MDM server resource 170-1. In such an instance, in response to receiving the message, the MDM proxy resource 140 then initiates communications with the MDM server resource 170-2 to check for available management information. Assuming that management information is available from the MDM server resource 170-2, the MDM proxy resource 140 retrieves the available management information from the MDM server resource 170-2. The MDM proxy resource 140 then forwards the retrieved management information from the MDM server resource 170-2 to the mobile computer device 150-1.

In yet further embodiments, note that the management information forwarded from a respective MDM server resource such as MDM server resource 170-2 can include an installation package to install a corresponding application on the mobile computer device 150-1. Upon or after receipt of an installation package at mobile computer device 150-1, the mobile computer device 150-1 executes installation package to install a corresponding application. Installation can be prompted by any suitable resource such as the user 108-1 of the mobile computer device 150-1, a respective administrator, etc. Accordingly, a respective administrator can facilitate distribution and installation of applications on each of the mobile computer devices present in network environment 100.

Figure 6:
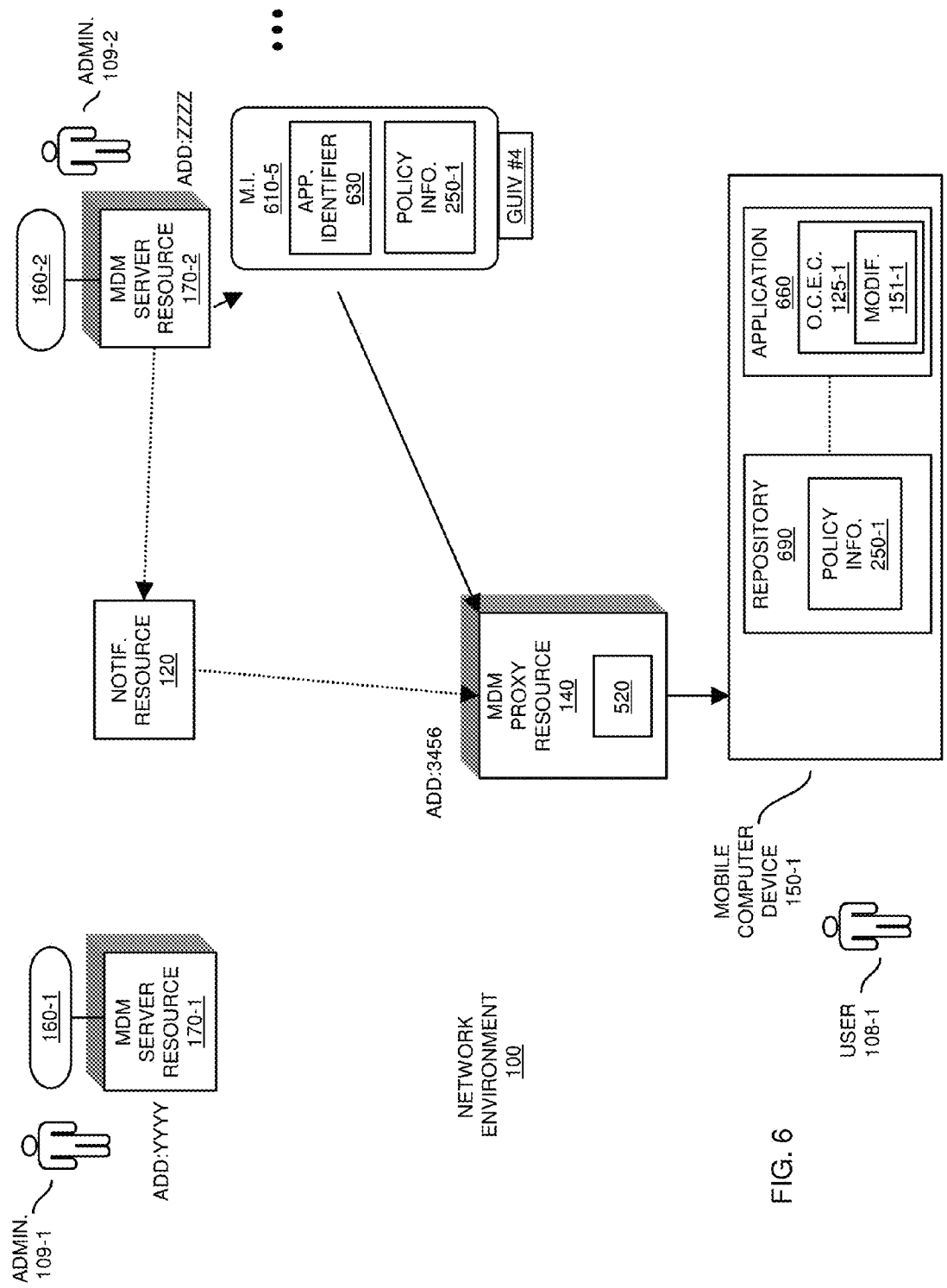
FIG. 6 is an example diagram illustrating generation of management information (such as policy information) to control execution of an application on a target mobile computer device according to embodiments herein.

FIG. 6 is an example diagram illustrating generation and distribution of policy information to control execution of an application on a target mobile computer device according to embodiments herein.

In accordance with yet further non-limiting example embodiments, the management information can include control information or configuration information to control operation of a particular application on the mobile device. In certain instances, the management information can be configured to specify the particular application on the mobile device to which the management information pertains.

More specifically, assume that the management information 610-5 as generated by administrator 109-2 includes data to be used by a corresponding mobile computer device 150-1 to control application 660 installed on the mobile computer device 150-1.

For sake of illustration, in a manner as previously discussed, assume that MDM server resource 170-2 notifies notification resource 120 to contact mobile computer device 150-1 regarding availability of management information 610-5. In response to receiving notification from notification resource 120, mobile computer device 150-1 communicates with MDM proxy resource 140 to retrieve the available management information 610-5.

In this example embodiment, management information 610-5 includes an application identifier 630 as well as corresponding policy information 250-1. The application identifier 630 specifies that the data such as corresponding policy information 250-1 in management information 610-5 pertains to application 660 installed on mobile computer device 150-1. Assume that mobile computer device 150-1 currently executes application 660.

Upon receiving management information 610-5 through MDM proxy resource 140, the mobile computer device 150-1 analyzes the application identifier 630 in management information 610-5 to identify that the corresponding payload (i.e., policy information 250-1) is to be used to control functionality associated with application 660. The mobile computer device 150-1 stores policy information 250-1 in repository 690. In one embodiment, the repository 690 represents storage space allocated specifically for use by application 660. The application 660 uses the policy information 250-1 to identify how to restrict or control use of functionality associated with application 660.

In accordance with further embodiments, note that the particular application 660 to which management information 610-5 is directed can be a wrapped application (i.e., an original application plus an additional set of executable instructions). In one embodiment, the application 660 includes originally compiled executable code 125-1 representing an original application and corresponding functionality; modification 151-1 represents an additional set of instructions inserted or associated with the application to control functionality associated with application 660.

In one example embodiment, the additional set of instructions provided in the wrapped application (application 660) can be configured to utilize the policy information 250-1 to control execution of functionality associated with the original application instructions (originally compiled executable code 125-1).

Note that additional details associated with generation of a wrapped application (such as originally compiled executable code 125-1 and modification 151-1) and generation of policy 250-1 are discussed in related U.S. Provisional Patent Application Ser. No. 61/781,481 entitled "Modification of Compiled Applications and Application Management Using Retrievable Policies," filed on Mar. 14, 2013, the entire teachings of which are incorporated herein by this reference.

Accordingly, the configuration information such as policy information 250-1 received from an MDM management server resource 170-2 and downloaded to the target mobile device 150-1 through the MDM proxy resource 140 can specify a policy of controlling a respective application (namely, application 660) on the mobile computer device 150-1.

Accordingly, the MDM proxy resource 140 provides a way for administrator 109-2 (who generates policy information 250-1) to distribute management information and control one or more corresponding applications on a respective mobile device.

In certain embodiments, the administrator 109-2 is able to control only certain applications installed on mobile computer device 150-1. For example, the mobile computer device 150-1 may be owned and purchased by user 108-1. However, the user 108-1 may choose to use mobile computer device 150-1 to carry out certain employee tasks for a corresponding organization employing user 108-1. To this end, the administrator 109-2 can produce management information including an application that is to be installed on the mobile computer device 150-1. Additionally, as previously discussed, the administrator 109-2 can generate corresponding policy information that is to be used by the installed application (such as application 660) to control corresponding functionality.

Figure 7:
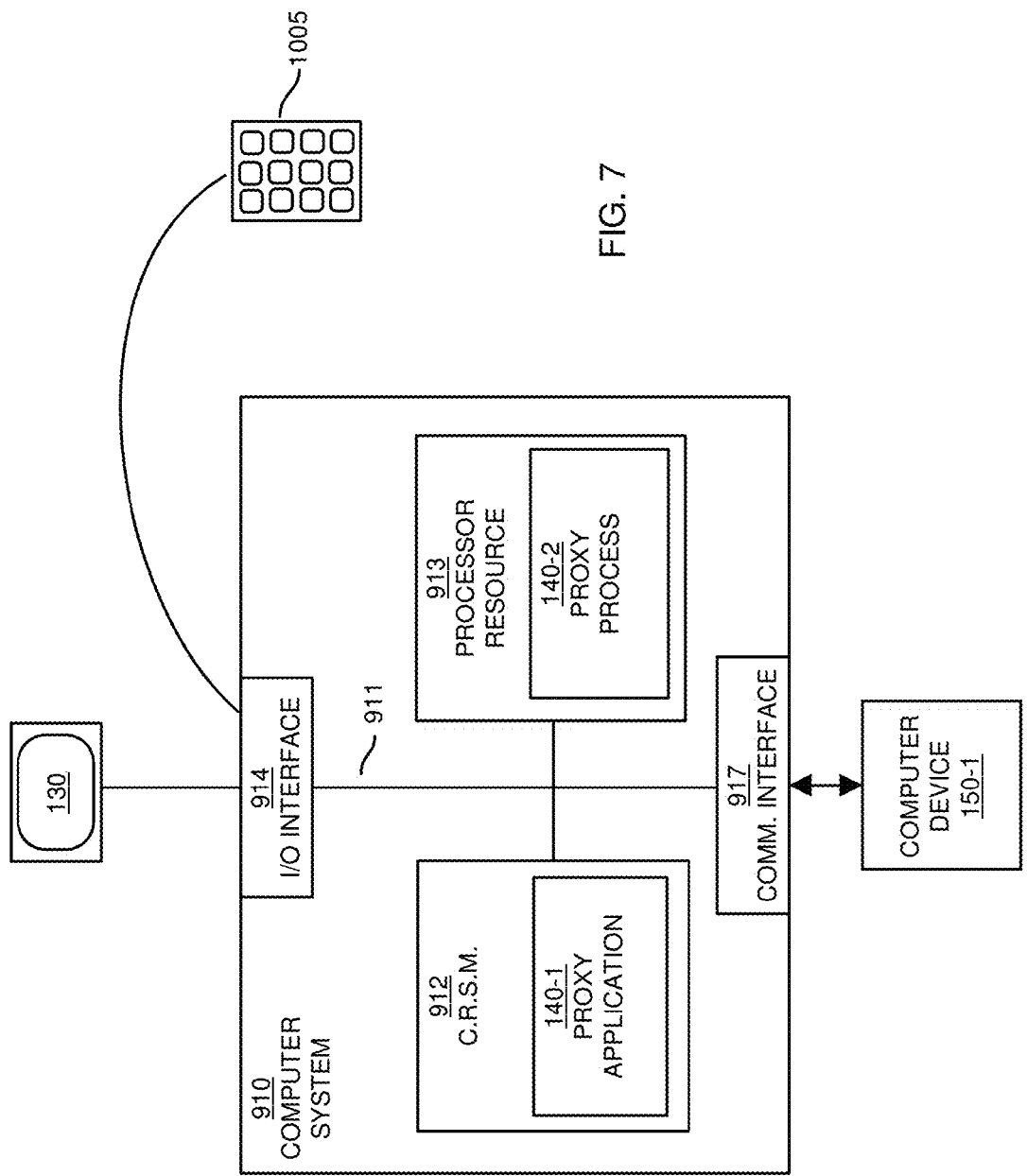
FIG. 7 is an example diagram illustrating an example computer architecture for implementing any functionality according to embodiments herein.

FIG. 7 is an example block diagram of a computer hardware for executing operations according to embodiments herein. Any of the functionality and/or resources as discussed herein (e.g., MDM server resource 170-1, MDM server resource 170-2, MDM proxy resource 140, mobile computer device 150-1, etc.) can be executed with computer system 910 or the like.

Computer system 910 (e.g., computer hardware, software, etc.) can be or include one or more computerized devices such as a mobile computer device, server, personal computer, workstation, portable computing device, mobile device, handheld device, console, network terminal, processing device, network device, etc. In one embodiment, computer system 910 represents MDM proxy resource 140 facilitating distribution of corresponding management information from one or more MDM server resources.

Note that the following discussion provides a basic embodiment indicating how to execute functionality according to embodiments herein using a computer system. However, it should be noted that the actual configuration for carrying out the operations as described herein can vary depending on a respective application.

As shown, computer system 910 of the present example includes an interconnect 911 that couples computer readable hardware storage media 912 (i.e., a non-transitory type of computer readable storage media) in which digital information can be stored and/or retrieved, a processor resource 913 (e.g., one or more processor devices or computer processing hardware), I/O interface 914, a communications interface 917, etc.

I/O interface 914 provides connectivity to different resources such as a repository, display screen, keyboard, computer mouse, etc.

Computer readable hardware storage medium 912 can be any suitable device such as memory, optical storage, hard drive, floppy disk, etc. In one embodiment, the computer readable storage medium 912 is a non-transitory computer readable storage media (i.e., any hardware storage media ort medium) to store instructions and/or data.

Communications interface 917 enables the computer system 910 and processor device 913 to communicate over a network to retrieve information from remote sources and communicate with other computers. In one embodiment, the I/O interface 914 enables processor device 913 to retrieve respective information from a repository.

As shown, computer readable storage media 912 can be encoded with proxy application 140-1 (e.g., software, firmware, etc.) executed by processor resource 913.

During operation of one embodiment, processor resource 913 (e.g., one or more computer devices) accesses computer readable storage media 912 via the use of interconnect 911 in order to launch, run, execute, interpret or otherwise perform the instructions of proxy application 140-1 stored on computer readable storage medium 912. Proxy application 140-1 can include appropriate instructions, logic, etc., to carry out any or all functionality associated with the resources (e.g., clients, servers, notification network, network administrator, etc.) in a computer network environment as discussed herein.

Execution of the proxy application 140-1 produces processing functionality such as proxy process 140-2 in processor resource 913. In other words, the proxy process 140-2 associated with MDM proxy resource 140 represents one or more aspects of executing proxy application 140-1 within or upon the processor resource 913 in the computer system 910.

Those skilled in the art will understand that the computer system 910 can include other processes and/or software and hardware components, such as an operating system that controls allocation and use of hardware resources to execute proxy application 140-1.

In accordance with different embodiments, note again that computer system 910 may be any of various types of devices, including, but not limited to, a mobile computer device, personal computer system, desktop computer, laptop, notebook, netbook computer, mainframe computer system, handheld computer, workstation, network computer, application server, storage device, a consumer electronics device such as a camera, camcorder, set top box, mobile device, portable handheld device, video game console, handheld video game device, a peripheral device such as a switch, modem, router, or in general any type of computing or electronic device.

Functionality supported by resources in network environment 100 will now be discussed via flowcharts in FIGS. 8 and 9. Note that there will be some overlap with respect to concepts discussed above for FIGS. 1 through 7. Also, note that the steps in the below flowcharts need not always be executed in the order shown. That is, the steps can be executed in any suitable order.

Figure 8:
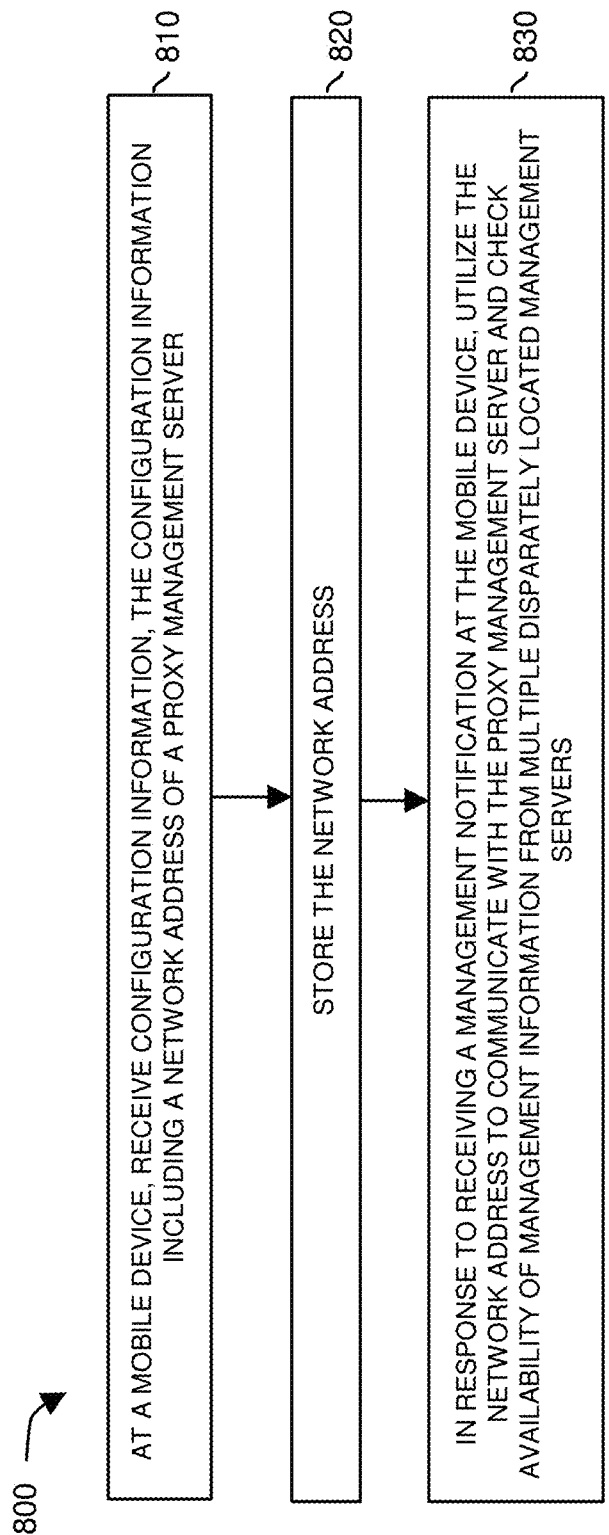
FIG. 8 is a flowchart illustrating an example method of configuring the corresponding mobile computer device with a network address of a proxy resource according to embodiments herein.

FIG. 8 is a flowchart illustrating an example method of configuring a mobile computer device and initiating retrieval of management information according to embodiments herein.

In processing operation 810 of flowchart 800, the mobile computer device 150-1 receives configuration information 145. The configuration information 145 includes a network address 3456 associated with a proxy management server such as MDM proxy resource 140.

In processing operation 820, the mobile computer device 150-1 stores the network address 3456 associated with the proxy management server.

In processing operation 830, in response to receiving a management notification from notification resource 120 (or other suitable resource), the mobile computer device 150-1 utilizes the network address 3456 to communicate with the proxy management server and check availability of management information from multiple disparately located management servers (such as MDM server resource 170-1 and MDM server resource 170-2).

Figure 9:
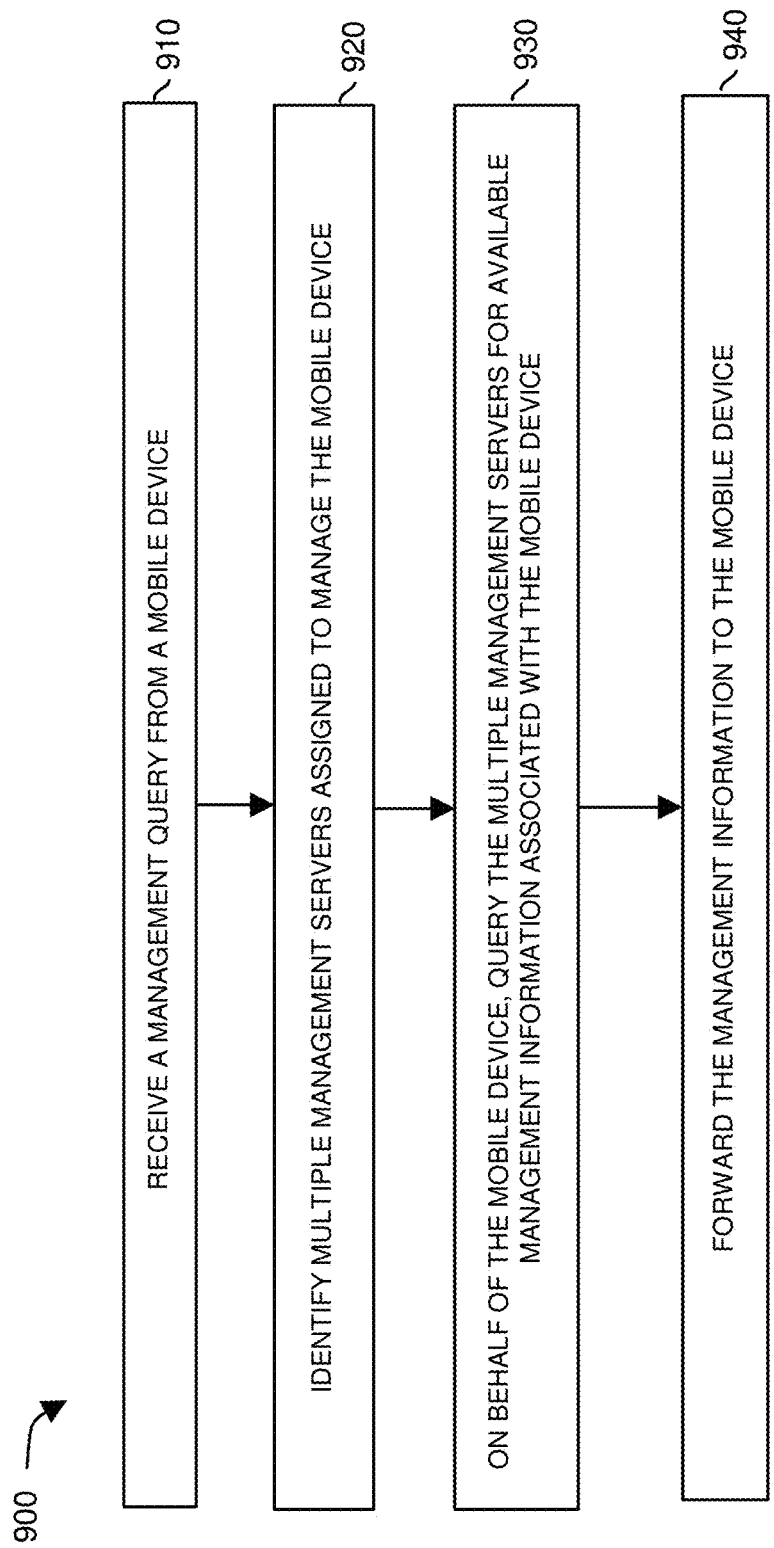
FIG. 9 is a flowchart illustrating an example method facilitating retrieval and forwarding of management information from a proxy management resource according to embodiments herein.

FIG. 9 is a flowchart illustrating an example method of providing access to management information via a proxy resource according to embodiments herein.

In processing operation 910 of flowchart 900, the MDM proxy resource 140 receives a management query from a mobile computer device 150-1.

In processing operation 920, the MDM proxy resource 140 identifies multiple management servers assigned to manage the mobile computer device 150-1.

In processing operation 930, on behalf of the mobile computer device 150-1, the MDM proxy resource 140 queries the multiple management servers for available management information associated with the mobile computer device 150-1.

In processing operation 940, the MDM proxy resource 140 forwards retrieved management information to the mobile computer device 150-1.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    at a mobile device, receiving configuration information from a suitable resource, the configuration information including a network address of a proxy management server;
    storing the network address in a location accessible to the mobile device; and
    in response to receiving a management notification at the mobile device, utilizing the network address to communicate with the proxy management server, such that the proxy management server checks availability of management information from multiple disparately located management servers.

2. The method as in claim 1, wherein receipt of the management notification indicates that the management information is available from at least one of the multiple disparately located management servers, the management information specifying control operations to be applied to the mobile device.

3. The method as in claim 1 further comprising:
    receiving the management notification from the proxy management server, the proxy management server receiving the management notification from one of the multiple management servers.

4. The method as in claim 1 further comprising:
    at the mobile device, receiving the management notification from a push notification server disparately located with respect to the management servers, the push notification server providing notification to the mobile device to indicate presence of the management information at least one of the management servers.

5. The method as in claim 1 further comprising:
    receiving first management information and second management information from the proxy management server, the proxy management server retrieving the first management information from a first management server to the mobile device, the proxy management server retrieving the second management information from a second management server to the mobile device.

6. The method as in claim 1, wherein the management information includes control information to control operation of a particular application on the mobile device, the management information specifying the particular application on the mobile device to which the management information pertains.

7. The method as in claim 1 further comprising:
    receiving a unique identifier value from the proxy management server, the proxy management server receiving the unique identifier value from a particular management server of the multiple management servers, the unique identifier value associated with management information generated by the particular management server;
    tagging communications with the unique identifier value; and
    transmitting the communications from the mobile device through the proxy management server to the particular management server with the unique identifier value.

* * * * *